United States Patent [19]

Nash

[11] 3,815,146

[45] June 4, 1974

[54] RECORD-TURNTABLE ASSEMBLY AND METHOD OF MAKING

[75] Inventor: Leonard A. Nash, Lake Forest, Ill.

[73] Assignee: Teletype Corporation, Skokie, Ill.

[22] Filed: Apr. 9, 1973

[21] Appl. No.: 349,132

[52] U.S. Cl. ................ 346/137, 29/432.2, 248/349, 269/50, 274/39 R

[51] Int. Cl. ........................................... G01d 15/32

[58] Field of Search ......... 346/137, 76 L; 274/39 R, 274/42 R, 41.6; 269/47, 50, 51; 248/349; 29/432, 432.1, 432.2

[56] References Cited

UNITED STATES PATENTS 2,093,550 9/1937 Cook ......................... 274/41.6 R X

*Primary Examiner*—Joseph W. Hartary
*Attorney, Agent, or Firm*—J. L. Landis

[57] ABSTRACT

A record and turntable assembly featuring precise and repeatable angular and linear positioning of the record on the turntable, and positive rotary drive. The turntable is provided with three conically tapered mounting pins projecting from the surface and arranged in a scalene triangular array. The record is formed with matingly tapered mounting holes arranged in a congruent triangular array, so that the record and turntable can be assembled by placing the record on the turntable with the holes received on and engaging the pins. This provides a positive drive between the turntable and record, and assures the desired, repeatable angular and linear positioning of record on the turntable.

8 Claims, 8 Drawing Figures

RECORD-TURNTABLE ASSEMBLY AND METHOD OF MAKING

INTRODUCTION AND BACKGROUND

This invention relates generally to the manufacture of a record and turntable assembly, with extremely precise and precisely repeatable alignment between the record and turntable.

While the invention has general utility for many applications, it is especially useful in various processes for recording information or data on a sensitive recording surface using an energy beam such as a laser, wherein extremely precise alignment between the record and the energy beam is desired. One particular process in which the invention can very profitably be used is a "laser writing," or recording process used to generate a memory by localized melting of selected areas along recording tracks in the surface of a thermoplastic film. Such a process may be generally as disclosed in H. Fleisher et al. U.S. Pat. No. 3,262,122 or C. O. Carlson U.S. Pat. No. 3,475,760, both herein incorporated by reference.

In such processes, the laser beam is selectively focused on the surface of a moving film to "write," and thereby generates minute melted depressions in the surface of the film, which can later be read out in various ways such as are disclosed in the cited patents or in an article "Color LP Discs Coming" by J. F. Lowe, in *Design News*, December 4, 1972, page 43, herein incorporated by reference. This process has the prospect of recording vast amounts of information per unit area of the film, because of the small size of the focused beam which can be used; for example, in one application of the process, over 4,000,000 individual bits of binary data have been recorded per square inch of record surface. In these laser-recording processes, the laser beam is moved relative to the record in a regular pattern of one type or another to form a track or channel, and the laser is effectively turned on or off according to the binary data, to record "1's" and "0's" along the track in accordance with the data, melt or no melt when using thermoplastic films.

This is one of many processes which have been proposed for recording information on a laser-responsive film or substrate of one kind or another. Similar processes have been proposed, using other types of energy beam, such as an electron beam in Newberry et al. U.S. Pat. No. 3,120,991, herein incorporated by reference.

In all of these beam-recording processes, it is advantageous to use a rotary disc as the record member, with a movable recording arm, such that the recording process generates a spiral or a concentric circular track in the record surface, generally analogous to the process used in making phonograph records. Rotary-disc recording and or read out processes along this line are described in the Newberry et al. patent and the Lowe article. The rotary disc approach to recording is very attractive, in that the recording process is very simple, a large amount of information can be recorded in a relatively small area, and playback or read-out is relatively simple.

SUMMARY OF THE INVENTION

A basic object of this invention is to provide an extremely precise mounting assembly and process for a record and a turntable, particularly one wherein any of a plurality of records can be aligned exactly with the turntable, removed and reassembled with the turntable in the same position an indefinite number of times over a long period of time.

With the foregoing and other objects in view, this invention relates to an improved record and turntable assembly and process, which are especially adapted for use in beam recording of the type described, but which can also be used in other environments where precise alignment and positive drive are desired. The assembly includes at least three conically tapered mounting pins secured to the turntable and projecting outward from a surface thereof. The record is formed with matingly tapered holes arranged in a corresponding array. With this arrangement, the record and turntable are assembled by placing the record on the turntable with the holes received on and engaging the pins. This provides a positive drive between the turntable and the record, and assures a fixed and repeatable angular and linear position of the record with respect to the turntable.

Preferably, the tapered walls of the mounting pins and the holes are matingly coined to provide precise registration and positioning. Also, it is preferred to arrange the pins and holes in congruent scalene triangular arrays, so that only one orientation of the record and turntable is possible.

Other objects, advantages and features of the invention will appear from the following detailed description of a specific embodiment thereof, when taken in conjunction with the appended drawings.

DRAWINGS

DETAILED DESCRIPTION

Background - Recording and Reproducing Process

Figure 1:
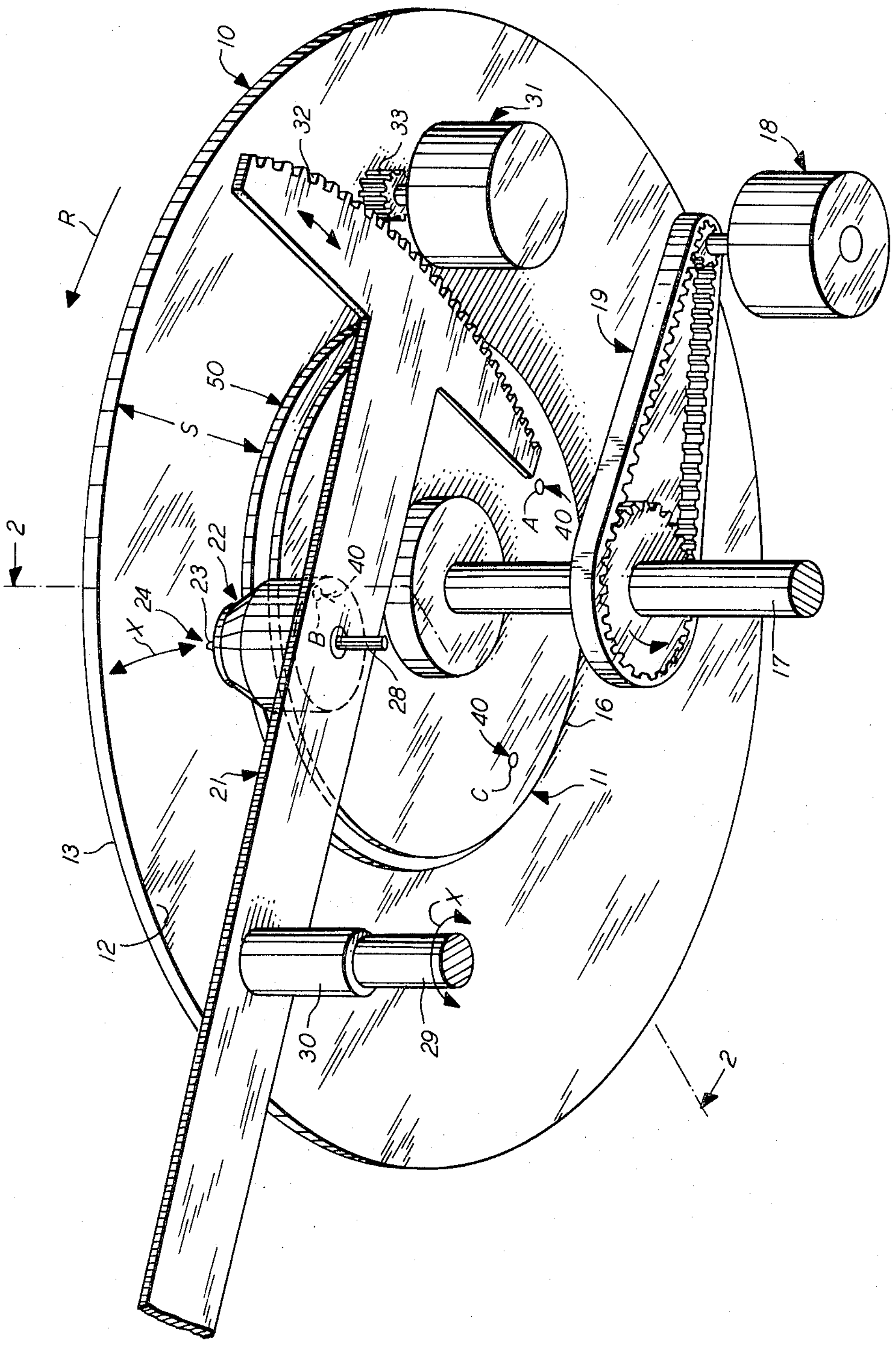
FIG. 1 is a partially schematic perspective view of a recording process and system, using a record-and-turntable assembly according to the invention.
Figure 2:
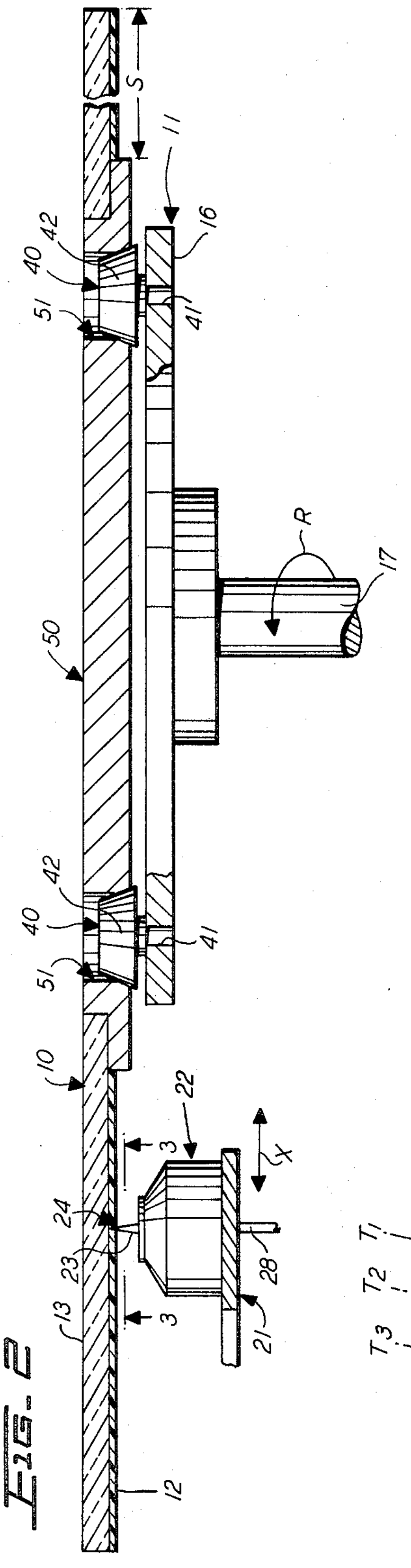
FIG. 2 is a vertical sectional view of the assembly, taken generally along lines 2—2 of FIG. 1 (and also of FIGS. 4 and 6)

Referring to the drawings, FIGS. 1 and 2 illustrate either the recording or the reproducing process, involving a record 10 detachably mounted on a turntable 11 in accordance with the principles of this invention. The record 10 includes a thin thermoplastic film 12 applied to the under surface of a backing disc 13 or substrate of high melting point material, such as glass. The film 12 may be an acrylic resin, or various other thermoplastic materials such as are mentioned in the Fleisher et al. or Carlson patents, and preferably is dyed with a material to increase its absorption of the laser energy to be applied.

The turntable 11 includes a flat disc or platform 16, above which the record 10 is received, and a shaft 17 for rotating the turntable 11 and record 10 (arrow R) by a constant speed drive motor 18 of any conventional type, for example through a sprocket-and-belt transmission 19.

Figure 3:
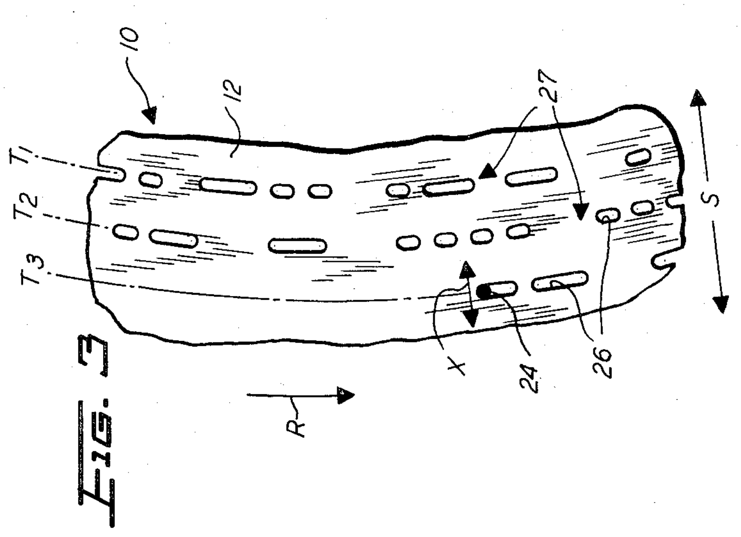
FIG. 3 is a greatly enlarged, fragmentary view of a portion of a recording, taken generally along line 3—3 of FIG. 2.

A recording arm 21 is mounted below the turntable 11 and parallel to the record 10, generally similar in arrangement to a standard phonograph recording arm. The arm 21 carries a generally conventional lens 22 for projecting a focused laser beam 23 on a small spot 24 on the surface of the thermoplastic film 12. For example, as explained in the Fleisher et al. or Carlson patents, when recording, the laser beam is either focused or not focused on the film 12, depending on the data to be recorded, or effectively is turned "on" and "off" as far as recording is concerned. As explained in those patents, this causes localized melting of the surface of the film 12 to form depressions or grooves such as 26 (FIG. 3), in the surface of the moving film 12 whenever the beam 23 has been turned "on," to record. When off, untouched areas or lands 27 are left between the grooves 26. An input laser beam 28 may be applied to the lens 22 in any of various known ways, for example as shown in the Fleisher et al. or Carlson patents, or the Lowe article.

The recording arm 21 is mounted on a shaft 29 parallel to the turntable shaft 17, or pivoting movement about the axis of the shaft 29 (arrow X). In the example illustrated, the shaft 29 is rotatable and is mounted in bushings such as 30 (one shown). The arm 21 may be pivoted, when desired, by a conventional reversible drive motor 31. In the example shown, the arm incorporates a gear sector 32, which is driven by a pinion 33 connected to the motor 31 so that the arm 21 can move across the recording surface S as required. With this arrangement, the lens 22 can transverse the operating surface S of the record 10 in generally conventional fashion so as to form a spiral recording track around the record 10, or the lens 22 can be stepped along the surface to preselected positions so as to form a plurality of concentric circular tracks, three of which are designated as $T_1$, $T_2$, $T_3$, in FIG. 3. When recording in concentric circular tracks, the motor 31 is a stepping motor, which can be energized to align the lens 22 with any selected one of several thousand recording tracks which can be formed along the recording surface.

Further details of typical recording processes, and steps which can be used to erase a recorded message, are described in the Fleisher et al. and Carlson patents. The recorded information may be read out in any known fashion, two methods being described in the Fleisher et al. and Carlson patents. Preferably, the record 10 is remounted on the same turntable 11, a desired channel or track T is selected by the stepping motor 31, and the turntable motor 18 is turned on. In this example, a reading or nondestructive laser beam is applied to the record 10 by the lens 22. Generally as described in the Lowe article, the amount of light energy of the reading beam reflected back to the lens 22 differs sufficiently, based on whether a groove 26 or a land 27 is present at any time, that this difference can be sensed by conventional means and converted into a binary data signal corresponding to the recorded data in a known fashion.

RECORD MOUNTING ASSEMBLY AND PROCESS

Referring now to FIGS. 4–7, this invention concerns the process and structure for accurately assembling the record 10 on the turntable 11, so that the record 10 is positively driven by the turntable 11 and is aligned therewith with great accuracy and with no free movement of the record possible in the horizontal, vertical or rotary directions.

Figure 5:
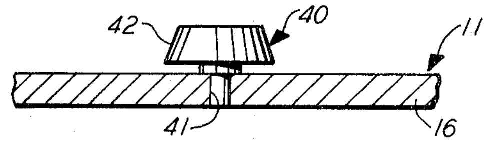
FIG. 5 is a fragmentary enlarged vertical section along a portion of line 2—2 of FIG. 4.
Figure 4:
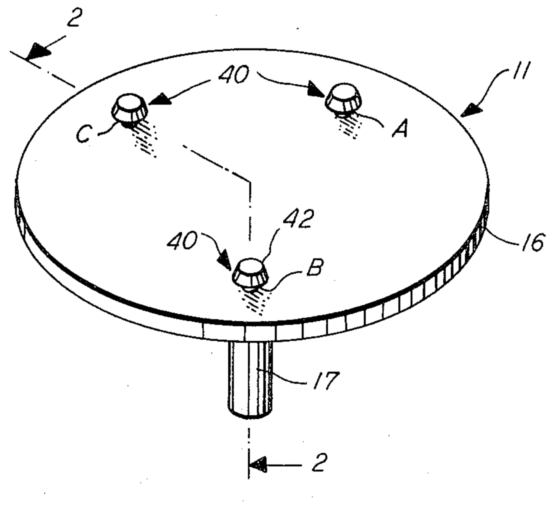
FIG. 4 is a detail perspective view of the turntable.

As illustrated in FIGS. 4–5, the turntable 11 is formed with a set of three upwardly projecting mounting pins 40, which are arranged at the vertices of a scalene triangle, A, B, C. The pins 40 are fixed to the turntable in the positions shown, as by press fitting in precisely located mounting holes 41 in the platform 16 of the turntable. The heads of the pins 40 are truncated cones, having conically tapered walls 42.

Figure 6:
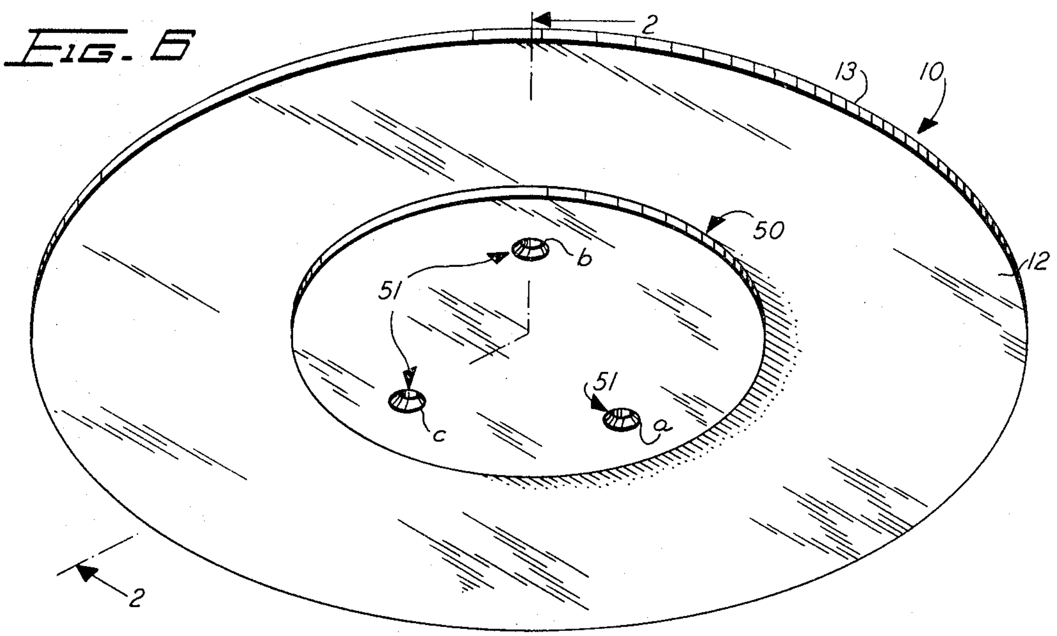
FIG. 6 is a detailed perspective view of the record.
Figure 7:
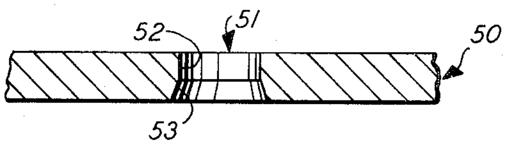
FIG. 7 is an enlarged vertical section along line 7—7 of FIG. 6.

Referring to FIGS. 6 and 7, the record 10 is formed with a central hub 50 of a relatively soft metal, such as brass, on which the backing disc 13 containing the film 12 is secured as shown in FIG. 2. A set of three mounting holes 51 are drilled through the hub 50, corresponding in position and shape to the three mounting pins 40 on the turntable 11. The holes 51 are disposed in a scalene triangular array *a, b, c*, congruent to the triangle A, B, C defined by the pins 40, so that the record 10 can be placed on the turntable 11, in only one possible rotary orientation in which all three mounting holes 51 align with the corresponding pins 40.

The mounting holes 51 include an upper cylindrical bore 52, and a conically tapered counterbore 53 at the bottom, with a slope exactly matching that of the tapered walls 42 of the pins 40, as noted by comparing FIGS. 5 and 7. The lower or larger diameter of each pin 42 is essentially equal to the lower or larger diameter of the counterbore 53, and the top or smaller diameter of the pin 42 is slightly smaller than the diameter of the bore 52.

With this arrangement, the record 10 and turntable 11 are assembled by placing the record 10 on the turntable 11, so that the mounting holes 51 fit over the corresponding pins 40 and allowing the record 10 to drop by gravity until the walls of the holes 51 engage and seat themselves on the pins 40, as illustrated in FIG. 2. Thus, the record 10 can be securely positioned and seated on the turntable 11 for positively driven rotation therewith, but is vertically spaced therefrom except for the portions of the mounting holes 51 engaging the pins 40.

The positioning and shape of the matingly tapered mounting holes 51 and pins 40 set a precise and repeatable vertical position of the record 10 with respect to the turntable 11. This is important in setting the spacing between the laser head 20 and the recording surface 12. When recording, the spacing between the lens 22 and the recording surface 12 is adjusted precisely as recording proceeds, to assure the proper focus of the laser beam 23 on the surface at all times; however, it is important to have a very close and repeatable preliminary setting based on the precise vertical position of the record 10 on the turntable 11, which facilitates the precise focusing adjustment during a recording process. With the record 10 so seated on the turntable pins 40, the record 10 is also fixed against any horizontal movement with respect to the turntable 11, either lineary or rotary, or any pivoting movement so that the record 10 maintains a precise vertical position once set on the pins 40.

Preferably, the slope of the conically tapered surfaces 42 and 53 is set for maximum ease in assembly and disassembly, while assuring a good fit. While the optimum angle may be determined empirically, it has been found in the embodiment illustrated that a vertex angle of about 40° for the pins 40 works very well.

To assure such precise and repeatable alignment, the tapered mounting surfaces 53 of the holes are coined by the pins 40 prior to the use of any particular record 10 in recording, to provide exact mating of the holes 51 on the pins 40. For this purpose, the pins 40 are formed of a harder material than that used in fabricating the hub 50 of the record 10. In one example, the pins 40 are made of ductile stainless steel, and the hub 50 is made of brass, so that the harder pins 40 can coin the tapered surfaces 53 of the holes 51.

Preferably, every record 10 to be used on a particular turntable 11 is precoined at the factory, so that all of the records 10 will seat on the turntable 11 in exactly the same vertical position. This obviates any possible alignment problems which might be caused by slightly inaccurate machining and positioning of the holes 51 during manufacture of the hubs 50, and makes for an inexpensive unit since absolutely accurate machining is not required. The coining operation is accomplished by assembling each record and turntable as shown in FIG. 2, and then pressing the hub 50 down on the turntable with sufficient force to permanently coin, or mold the holes 51 to fit the pins 40 exactly. Pressure must be applied evenly so that recording surface plane is at right angles to shaft 17. The assembly is then separated by pulling the hub 50 away from the turntable and the record 10 is ready for use.

Thereafter, when initially used in recording and whenever later used for read out, each individual record 10 will permanently match the original turntable 11 on which it was coined, so as to insure precise registration and fit between the turntable and record as previously described.

Figure 8:
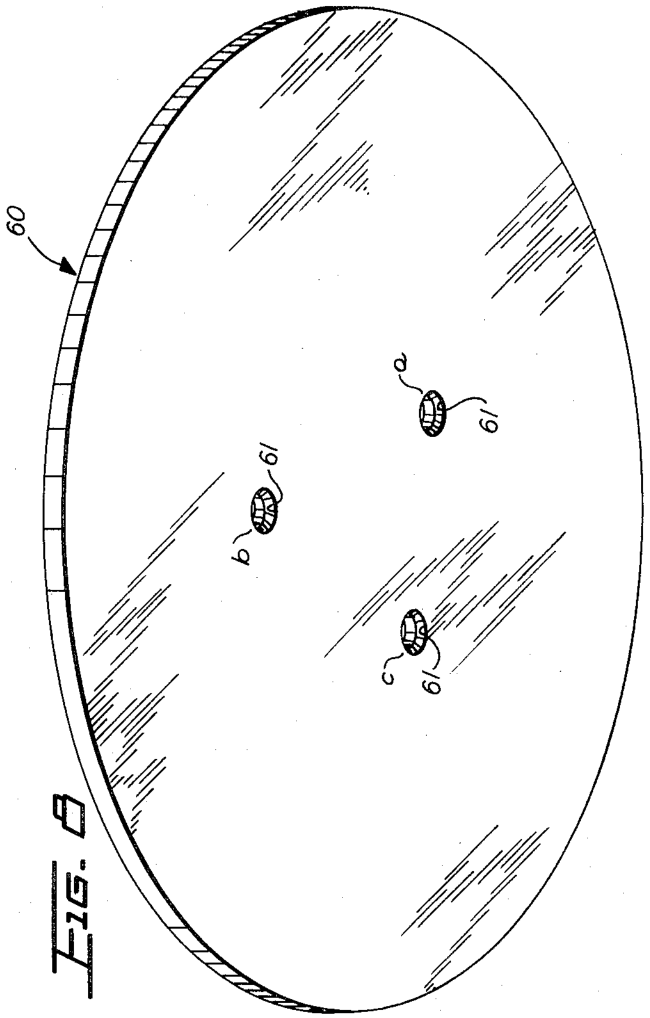
FIG. 8 is a perspective view of a master coining plate used to coin a set of mounting pins on the turntable.

In accordance with a preferred process for practicing the invention, it is further preferred to coin the pins 40 of each of a plurality of turntables 11 from a master coining die or plate 60 shown in FIG. 8. This still further simplifies the manufacturing operation and reduces expense in manufacture of the equipment.

Referring to FIG. 8, the master coining plate 60 is formed with coining holes 61 arranged in a triangular array *a*, *b*, *c*, exactly the same as the mounting holes 51 in the record 10. The holes 61 are exactly the same size and shape as the holes 51 (FIG. 7); however, the plate 60 is made of a material such as tool steel, which is sufficiently harder than the material of which the pins 40 are made that the plate 60 can in turn coin the pins 40 to match the holes 61.

Thus, only the single master plate 60 need be machined with great precision, and the turntable pins 40 will necessarily follow the precise formation of the coining holes 61. This initial coining process is essentially the same as the record coining process previously described, in that the master plate 60 is pressed down on each turntable 11 after assembly to the same position generally shown in FIG. 2, and then removed. This permanently molds the tapered walls 42 of the pins 40 to exactly the pattern of the coining holes 61. Once set, the pattern of the pins 40 will remain for the life of the turntable 11 in normal use, and a single master plate 60 may thus be used to coin a large number of turntables 11. Thus, each turntable 11 will have the same coined pattern of mounting pins 40, and the records 10 may be used effectively with various turntables 11 made from the same master plate 60.

With this arrangement and assembly process, it should be apparent that great accuracy can be achieved in the positioning of the record on the turntable, which positioning is precisely repeatable for read out and repeated use of the same record and turntable at different times. The record can readily be placed on the turntable in a precise horizontal position, with no free movement of the record possible in any direction, but can easily be lifted off when the record is to be changed. Also, the assembly is simple in construction, nearly indestructible in normal use, and of moderate cost.

While one specific embodiment and usage of the invention has been described in detail above, it will be obvious that various modifications may be made from the specific details, steps and uses described, without departing from the spirit and scope of the invention.

What is claimed is:

1. A record and turntable assembly comprising:

at least three conically tapered mounting pins secured to the turntable in a polygonal array and projecting outward from a surface thereof, the record having matingly tapered mounting holes arranged in a corresponding array so that the record and turntable can be assembled by placing the record on the turntable with the holes received on and engaging the pins to assure a positive drive between the turntable and the record in a fixed position, the holes and pins being of such dimensions that the body of the record is spaced from the surface of the turntable, and the only support is through the walls of the holes engaging the mounting pins.

2. The assembly as recited in claim 1, wherein the holes and pins are arranged in congruent scalene triangular patterns, so that only one orientation of the record and turntable is possible.

3. The assembly as recited in claim 2, wherein the turntable pins are made of a relatively hard material compared to the material of the walls of the holes, such that the record holes can be coined to match the pins by pressing the record and turntable together with sufficient force to coin the holes.

4. A record and turntable assembly comprising:

at least three conically tapered mounting pins secured to the turntable in a polygonal array and projecting outward from a surface thereof, the record having matingly tapered mounting holes arranged in a corresponding array so that the record and turntable can be assembled by placing the record on the turntable with the holes received on and engaging the pins to assure a positive drive between the turntable and the record in a fixed position, the tapered walls of the pins and holes being matingly coined to provide precise registration and positioning.

5. The assembly as recited in claim 4, wherein the tapered walls of the holes and pins are matingly coined, and the holes and pins are arranged in congruent scalene triangular arrays.

6. A process of manufacturing a record and turntable assembly and assembling the record with the turntable, which comprises:

forming a turntable having a set of three conically tapered mounting pins secured to the turntable in a triangular array and projecting outward from a surface thereof;

providing a record having matingly tapered mounting holes arranged in a corresponding array;

coining the tapered walls of the holes to mate with the pins so as to provide precise registration and positioning, the turntable pins being made of a relatively hard material compared to the material of the walls of the holes, the holes being coined by pressing the record and turntables together with sufficient force to coin the holes; and placing the record on the turntable with the holes received on and engaging the pins to assure a positive drive between the turntable and the record in a fixed position.

7. The process as recited in claim 6, further comprising the steps of:

forming a master plate with tapered coining holes corresponding exactly to those of the record, the master plate being of harder material than the pins; and then pressing the master plate together with the turntable with sufficient force that the coined holes in the master plate coin the tapered surfaces of the pins, both additional steps being performed prior to the coining step recited in claim 6.

8. The process as recited in claim 6, wherein the holes and pins are arranged in congruent scalene triangular patterns, so that only one orientation of the record and turntable is possible.

* * * * *